United States Patent [19]

Shepherd, Jr.

[11] B 3,916,017
[45] Oct. 28, 1975

[54] POLYCYCLIC COMPOUNDS
[75] Inventor: Lawrence H. Shepherd, Jr., Baton Rouge, La.
[73] Assignee: Ethyl Corporation, Richmond, Va.
[22] Filed: Aug. 27, 1973
[21] Appl. No.: 391,675
[44] Published under the Trial Voluntary Protest Program on January 28, 1975 as document no. B 391,675.

Related U.S. Application Data

[60] Continuation-in-part of Ser. Nos. 288,115, Sept. 11, 1972, abandoned, and Ser. No. 291,647, Sept. 25, 1972, Pat. No. 3,810,949, said Ser. No. 288,115, is a division of Ser. No. 888,071, Dec. 24, 1969, abandoned, said Ser. No. 291,647, is a continuation-in-part of Ser. No. 888,071.

[52] U.S. Cl.... 260/666 PY; 260/648 R; 260/666 A; 252/46.6
[51] Int. Cl.² ......................................... C07C 13/54
[58] Field of Search ............................. 260/666 PY

[56] References Cited
UNITED STATES PATENTS
3,476,788  11/1969  Bruno ........................... 260/666 PY
3,662,010  5/1972  Legendre ..................... 260/666 PY

OTHER PUBLICATIONS

Cesca, S. et al., Chem. Abst. 73: 76744y 1970.

*Primary Examiner*—Paul M. Coughlan, Jr.
*Assistant Examiner*—Veronica O'Keefe
*Attorney, Agent, or Firm*—Donald L. Johnson; John F. Sieberth

[57]     ABSTRACT

Tricyclo[5.2.1.0$^{2,6}$]dec-3-enes having an allylic group in the 8 or 9 position may be made by reacting a cyclopentadiene dimer with a 2-alkenyl magnesium compound co-reactive therewith to effect intermolecular addition, and then hydrolyzing the addition product so formed. These substituted tricyclo[5.2.1.0$^{2,6}$]dec-3-enes are useful, inter alia, as monomers for the manufacture of EPT and a raw material for the synthesis of lubricating oil additives and flame retardants for flammable polymers.

4 Claims, No Drawings

POLYCYCLIC COMPOUNDS

REFERENCE TO RELATED APPLICATIONS

This application is a continuation-in-part of my prior co-pending applications Ser. No. 288,115, filed Sept. 11, 1972, now abandoned and Ser. No. 291,647, filed Sept. 25, 1972, now U.S. Pat. No. 3,810,949. Application Ser. No. 288,115 is in turn a division of application Ser. No. 888,071 filed Dec. 24, 1969 and now abandoned, and application Ser. No. 291,647 is in turn a continuation-in-part of said application Ser. No. 888,071. The entire disclosure of said application Ser. No. 291,647 (U.S. Pat. No. 3,810,949) is incorporated herein as if fully set forth in this specification.

SUMMARY AND DESCRIPTION OF THE INVENTION

This invention relates to and provides tricyclo-[5.2.1.0$^{2,6}$]dec-3-enes having an allylic group in the 8 or 9 position. They may be made by reacting a cyclopentadiene dimer with a 2-alkenyl magnesium compound co-reactive therewith to yield an intermolecular addition product and, once the addition product is formed, hydrolyzing the same.

The preferred compounds may be made by reacting (i) cyclopentadiene dimer or cyclopentadiene dimers substituted with one or more lower alkyl groups or lower alkenyl groups, or both, with (ii) a 2-alkenyl magnesium compound co-reactive with the dimer compound to effect intermolecular addition between said compounds, and then hydrolyzing the organomagnesium addition product so formed.

Suitable conditions for the addition reaction and the hydrolysis are given in application Ser. No. 291,647, filed Sept. 25, 1972, now U.S. Pat. No. 3,810,949.

Illustrative organomagnesium reactants (lower 2-alkenyl magnesium compounds) are allylmagnesium chloride, allylmagnesium bromide, allylmagnesium iodide, bis-allylmagnesium, methallyl magnesium choride, methallyl magnesium bromide, methallyl magnesium iodide, bis-methallyl magnesium, 2-butenyl magnesium chloride, 2-butenyl magnesium bromide, 2-butenyl magnesium iodide, bis-(2-butenyl)magnesium, 2-pentenyl magnesium chloride, 2-hexenyl magnesium bromide, 4-methyl-2-pentenyl magnesium bromide, cinnamyl magnesium bromide, and the like. The most preferred 2-alkenyl magnesium compounds are allylmagnesium chloride and allylmagnesium bromide.

As a general rule the 2-alkenyl Grignard reactants will be subjected to the above addition reactions in a reaction medium composed predominately of an ether whereas the bis-(2-alkenyl)magnesium reactants are usually produced and used in a reaction medium composed predominately of a suitable paraffinic, cycloparaffinic or aromatic hydrocarbon. Exemplary reaction media and further details concerning the addition reaction and the hydrolysis reaction are given in application Ser. No. 291,647, filed Sept. 25, 1972 (U.S. Pat. No. 3,810,949).

This invention will become still further apparent from a consideration of the following illustrative example.

EXAMPLE

Reaction Between Allylmagnesium Bromide And Cyclopentadiene Dimer Followed By Hydrolysis Allylmagnesium bromide (50 mmoles) and cyclopentadiene dimer (50 mmoles) were reacted in ether in a sealed bomb at 125°C. for 3 hours. Hydrolysis of the reaction product liberated two $C_{13}$ hydrocarbons. The reaction sequence proceeded as follows:

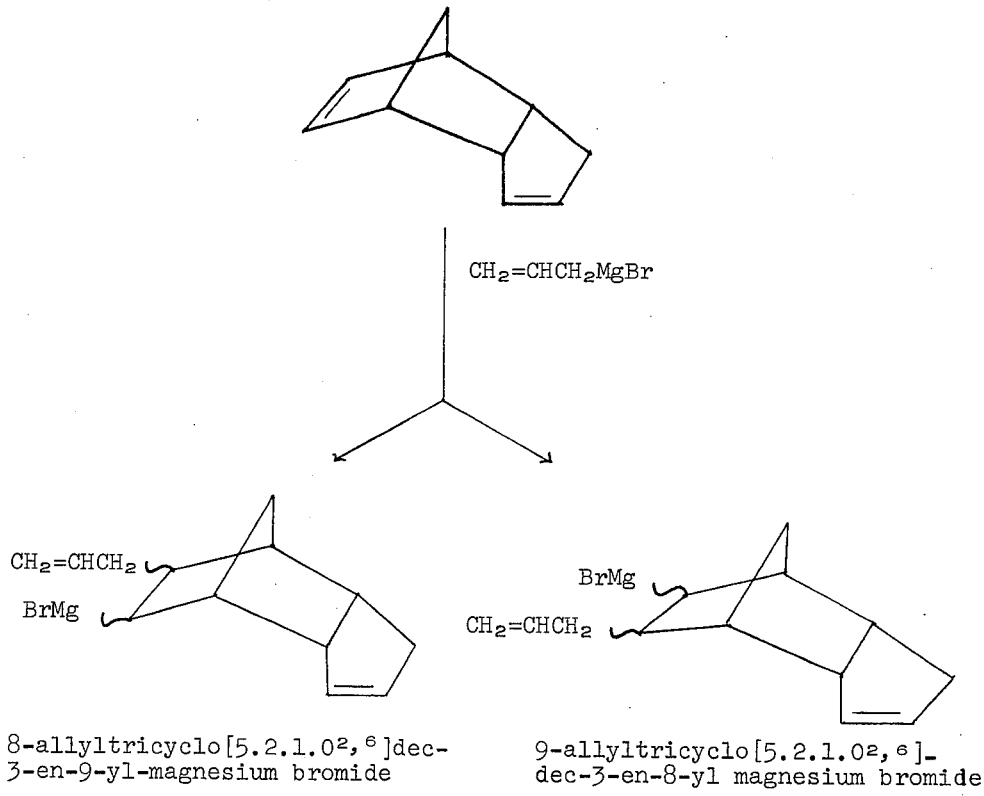

8-allyltricyclo[5.2.1.0$^{2,6}$]dec-3-en-9-yl-magnesium bromide 9-allyltricyclo[5.2.1.0$^{2,6}$]-dec-3-en-8-yl magnesium bromide

↓ $H_2O$          ↓ $H_2O$

—Continued

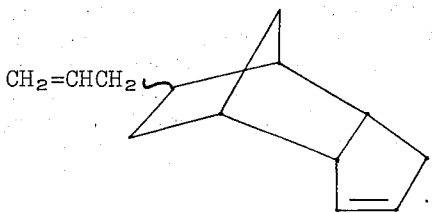

8-allyltricyclo[5.2.1.0$^{2,6}$]-
dec-3-ene

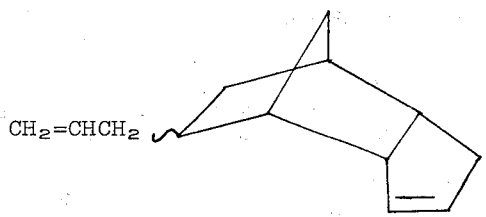

9-allyltricyclo[5.2.1.0$^{2,6}$]-
dec-3-ene

Naturally if the cyclopentadiene dimer subjected to the addition reaction has one or more lower alkyl and-/or lower alkenyl substituents in the molecule (i.e., if the ring is substituted with alkyl and/or alkenyl groups each of which contains up to about 6 carbon atoms, is inert under the reaction conditions, and does not adversely affect the addition reaction) the resultant tricyclo[5.2.1.0$^{2,6}$]dec-3-ene produced on hydrolysis of the intermediate addition product will not only possess an allylic group in the 8 or 9 position but will retain its initial alkyl and/or alkenyl substituents. Methylcyclopentadiene dimer serves as an example of a suitable substituted dimer reactant of this type. Other inert substituents (i.e., substituents which do not take part in nor prevent the desired addition reaction) may be present in the dimer reactant. The preferred compounds of this invention are tricyclo[5.2.1.0$^{2,6}$]dec-3-enes having an allylic group (most preferably, the allyl group) in the 8 or 9 position, further substitution, if any, being limited to (a) lower alkyl substitution, (b) lower alkenyl substitution, or (c) a combination of (a) and (b).

The novel compounds of this invention are of considerable utility. Since they possess an allylic substituent they may be utilized as alpha-olefin type monomers. For example they may be co-polymerized with ethylene or propylene in accordance with known Ziegler/Natta type technology in order to form a variety of polymers of differing physical properties. In this connection, the compounds of this invention are of particular utility as third monomers for the manufacture of EPT (ethylene-propylene terpolymer), a type of synthetic elastomer of known usefulness in the chemical and allied arts. The manner of using third monomers to confer unsaturation in EPT to render it readily curable constitutes well known technology and the compounds of this invention may be employed in accordance with such known technology. For further details concerning the manufacture and uses of EPT one may refer for example to Kirk-Othmer, Encyclopedia of Chemical Technology, Second Edition, Volume 7, pages 686–7, copyright 1965 (and references cited therein).

Another utility for the compounds of this invention is in the manufacture of lubricating oil, grease and cutting oil additives. In this utility the compounds of this invention may be reacted with phosphorus pentasulfide in accordance with known technology to produce reaction products which are useful, inter alia, as antioxidants and extreme pressure additives when employed in small concentration in lubricating oils, greases, and cutting oils. Anyone wishing further details concerning the manufacture of such products or the manner of using them may refer to the comprehensive patent literature on the subject, U.S. Pat. No. 2,534,217 serving as but one typical reference.

Since the compounds of this invention possess olefinic unsaturation they can be halogenated by standard techniques so as to add halogen atoms to both double bonds and thereby produce such compounds as 8-(2,3-dibromopropyl)-3,4-dibromotricyclo-[5.2.1.0$^{2,6}$]decane, 9-(2,3-dibromopropyl)-3,4-dibromotricyclo-[5.2.1.0$^{2,6}$]decane, 8-(2,3-dichloropropyl)-3,4-dichlorotricyclo-[5.2.1.0$^{2,6}$]decane, 9-(2,3-dichloropropyl)-3,4-dichlorotricyclo-[5.2.1.0$^{2,6}$] decane, and the like. Such halogenated hydrocarbons may be used as flame retardants in polypropylene, ABS, epoxy resins, polyesters, polyurethanes, chlorinated rubbers or other thermoplastic or thermosetting polymers and resins. Generally speaking, additive type flame retardants are employed in amounts of up to about 30 percent by weight in the polymer and when using the tetrahalo derivatives of the compounds of this invention in this manner it may be found advantageous to use them in conjunction with antimony oxide in accordance with known technology.

Other uses for the compounds of this invention include their use as intermediates for the manufacture of flotation chemicals, germicides, insecticides, fungicides, insect repellants, water proofing agents, plasticizers, and emulsifying agents. In addition, the compounds of this invention are flammable and thus may be used as sources of heat, light, carbon dioxide and water. Still other uses for the compounds of this invention will become evident to those skilled in the art now that the art has been furnished these new chemical compounds.

It is to be understood and appreciated that although three dimensional molecular structures have been depicted in this description of the invention, it is not intended that the invention be limited to any given geometric or stereo isomer. The three dimensional formulas depicted herein have been utilized simply as a convenient way of representing the complex polycyclic compounds involved in the practice of this invention.

I claim:
1. Tricyclo[5.2.1.0$^{2,6}$]dec-3-ene having an allylic group in the 8 or 9 position.
2. A composition according to claim 1 wherein said compound is 8-allyltricyclo[5.2.1.0$^{2,6}$]dec-3-ene.
3. A composition according to claim 1 wherein said compound is 9-allyltricyclo[5.2.1.0$^{2,6}$]dec-3-ene.
4. A composition according to claim 1 wherein the composition is a mixture of 8-allyltricyclo[5.2.1.0$^{2,6}$]dec-3-ene and 9-allyltricyclo[5.2.1.0$^{2,6}$]dec-3-ene.

* * * * *